United States Patent [19]

Hassel

[11] 3,923,368

[45] Dec. 2, 1975

[54] KALEIDOSCOPE

[76] Inventor: Jon M. Hassel, Apt. A-929, 463 West St., New York, N.Y. 10014

[22] Filed: June 12, 1974

[21] Appl. No.: 478,591

[52] U.S. Cl. .................................................. 350/4
[51] Int. Cl.² ......................................... G02B 27/08
[58] Field of Search ................... 350/4, 5; 353/1, 2; 46/1 L, 21

[56] References Cited
UNITED STATES PATENTS

| | | | |
|---|---|---|---|
| 984,198 | 2/1911 | Dougall | 350/4 |
| 1,623,545 | 4/1927 | Loewenbach | 46/21 X |
| 1,861,206 | 5/1932 | Burgess | 46/21 X |
| 2,075,259 | 3/1937 | Battjes | 46/21 |
| 2,232,953 | 2/1941 | Mallgraf | 46/21 |
| 2,452,363 | 10/1948 | Flotron | 350/4 |
| 2,900,867 | 8/1959 | Beatman | 350/4 |
| 2,965,376 | 12/1960 | Kessler | 46/21 X |
| 3,066,571 | 12/1962 | Shaffer | 350/4 |
| 3,111,878 | 11/1963 | Welles et al. | 350/5 |

FOREIGN PATENTS OR APPLICATIONS

| | | | |
|---|---|---|---|
| 595,972 | 12/1947 | United Kingdom | 350/4 |
| 751,358 | 9/1933 | France | 350/4 |
| 1,051,825 | 1/1954 | France | 350/4 |

*Primary Examiner*—Joseph F. Peters, Jr.
*Assistant Examiner*—Alan Mathews
*Attorney, Agent, or Firm*—Peter L. Tailer

[57] ABSTRACT

A book, poster, or other graphic work has a decorative, varied path that winds about the work, and it has a kaleidoscope assembled from flat, die-cut reflective material, the kaleidoscope being used to view and follow the path on the graphic work. The assembled kaleidoscope preferrably has three internal reflective faces folded to be at 60 degrees to each other and a tab extending through a slit securing the folded faces together, the tab projecting from the assembled kaleidoscope and serving as its handle. A round eye piece containing a triangular opening corresponding to the end of the kaleidoscope is fixed thereover to protect the eye of a user from sharp corners.

1 Claim, 7 Drawing Figures

KALEIDOSCOPE

DESCRIPTION OF THE PREFERRED EMBODIMENT

Figure 1:
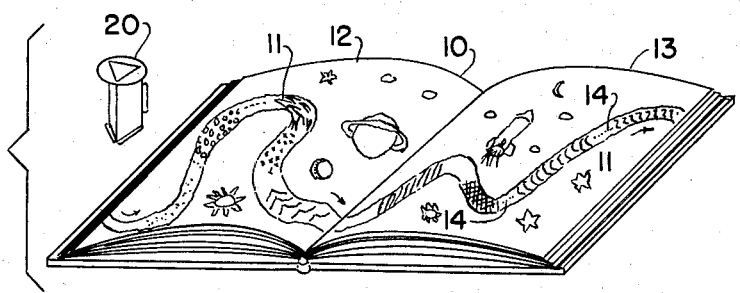
FIG. 1 is a perspective view of an opened children's book with a decorative path formed wandering across pages thereof and of an assembled kaleidoscope used to follow the path.
Figure 3:
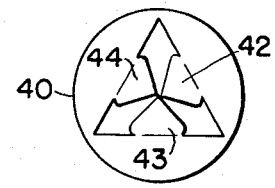
FIG. 3 is a plan view of the kaleidoscope eye piece prior to having its tabs folded downward.
Figure 5:
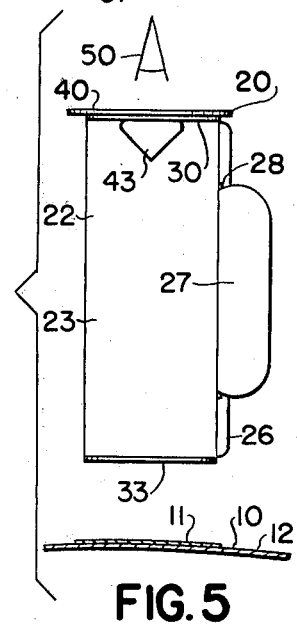
FIG. 5 is a side view of the assembled kaleidoscope with the eye of a user represented thereover and with the kaleidoscope shown over a vertical section through a graphic work having a decorative path formed thereon.
Figure 6:
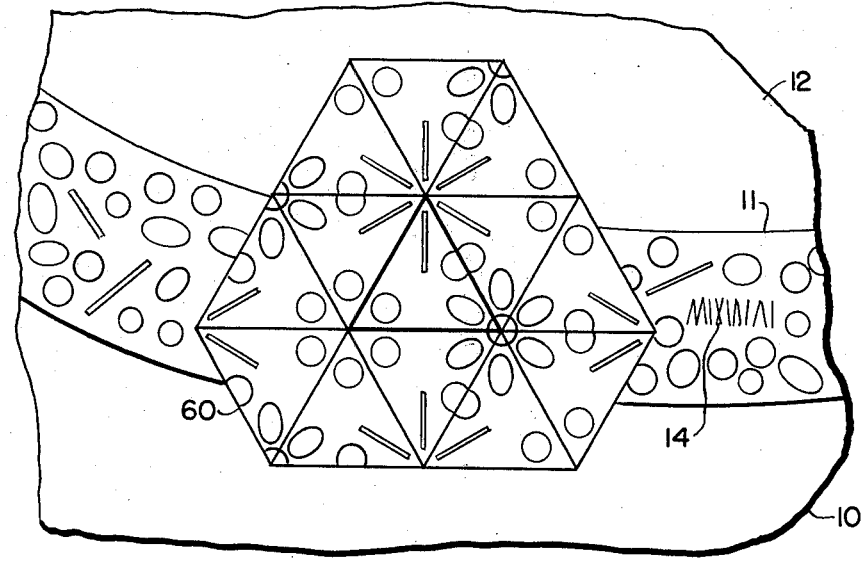
FIG. 6 is a top view of a fragment of a graphic work having a decorative path formed thereon and of a geometric pattern showing what a viewer might see through the kaleidoscope.
Figure 7:
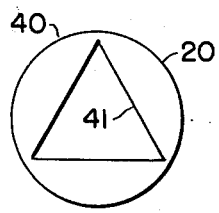
FIG. 7 is a top view of the kaleidoscope.

As shown in FIGS. 1, 5, and 6, a graphic work, generally a book 10, has a colorful decorative path 11 printed on it to wind or otherwise form a passage across and about one or more pages 12 and 13. In one example of this invention, the book 10 is entitled FANTASY VOYAGE THROUGH OUTER SPACE and the path 11 winds throughout the book 10 being picked up from page to page. This specific full color book 10 has a path 11 which varies in the colorful forms of its composition and it winds about representations of fanciful celestial objects. Words 14 of a story line or other narrative or descriptive material appear in sequence at intervals along path 11 to be read by a user.

Figure 4:
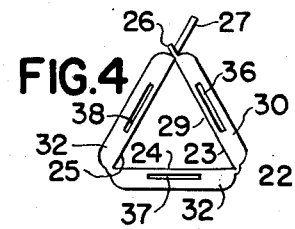
FIG. 4 is a top view of the assembled kaleidoscope body.
Figure 2:
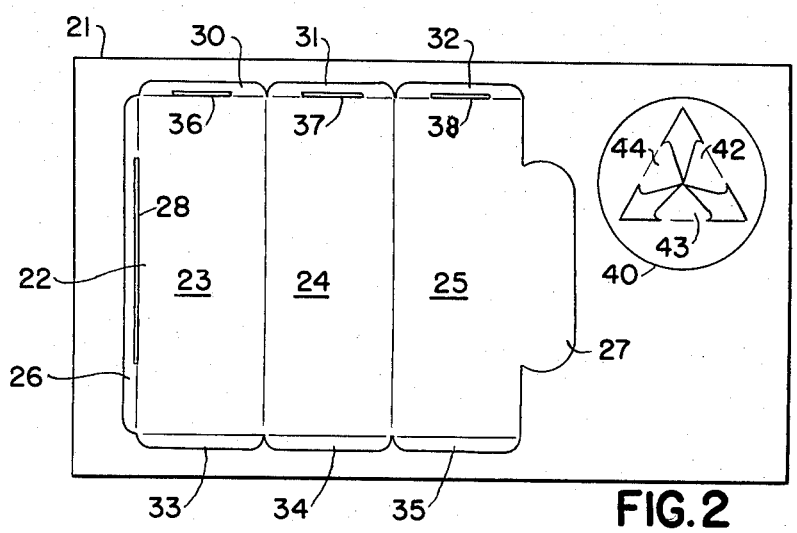
FIG. 2 is a plan view of a blank from which the kaleidoscope of FIG. 1 is assembled.

A kaleidoscope 20 is assembled from a blank 21 in which the elements are die-cut and pushed therefrom for assembly. A kaleidoscope body 22 has three panels 23, 24, and 25, a side tab connected to panel 23, and a grip tab connected to panel 25. Side tab 26 contains a slit 28 at its juncture with panel 23 to receive grip tab 27 therethrough in assembly. The body 22 is assembled as shown in FIGS. 4 and 5 with a silver reflective surface 29 inside. Blank 21 may be made from a heavy paper with a reflective plastic layer laminated thereon. End flaps 30–35 are folded at right angles to the panels 23–25 to which they are attached. At least the eye piece tabs 30–32 contain slits 36–38 formed at their junctures with the panels 23–25.

The round eye piece 40 has a triangular opening 41 therein into which project three tabs 42–44. These tabs 42–44 are folded downward and inserted in the slits 36–38 of body 22 to complete the assembly of the kaleidoscope 20. The kaleidoscope 20 is inexpensive to provide, it is easily made for packaging and sale with a book in flat form, it is easily assembled, and it is safe to use as the round eye piece 40 protects the eye 50 of a user from sharp corners of the assembled body 22.

As shown in FIG. 5, in use, the kaleidoscope 20 is held by grip tab 27 from one quarter to one inch from page 12 and moved along path 11. In FIG. 5, the viewer's eye is represented at 50. Kaleidoscope 20 is held above path 11 to allow outside light to illuminate path 11 under the kaleidoscope 20. The outer surface of the kaleidoscope 20 may be printed to represent a rocket ship, a time machine, or any other device which lends itself to the subject matter of a book 10.

While all the elements of this invention are simple, the combination must be used to be appreciated. Only in use may the new, unobvious, and astounding results be fully understood. While the book or other graphic work 10 may be enjoyed by itself, with the kaleidoscope 20 a whole new visual stimulus, action potential, and enjoyment results. There is surprise and excitement in following the path 11 as unexpected patterns appear and blossom in the kaleidoscope 20. A representation of such a pattern is shown at 60 in FIG. 6 over path 11. A very slight movement of the kaleidoscope 20 completely changes the pattern 60 as path 11 is followed. A story sequence is read from words 14 printed in sequence along path 11. This invention reaches new heights in children's books as well as in other applications.

While this invention has been shown and described in the best form known, it will nevertheless be understood that this is purely exemplary and that modifications may be made without departing from the spirit of the invention. For example, while the path 11 is shown wider than the opening through the body 22 of the kaleidoscope 20, it may be narrower in some places if desired. Almost limitless patterns and forms and color blendings may comprise path 11. Path 11 may be composed of representations of objective, recognizable objects or of completely non-objective patterns.

What is claimed is:

1. A kaleidoscope for viewing a graphic work, said kaleidoscope being assembled from a single blank of sheet material having a reflective surface, said kaleidoscope comprising, in combination, a center panel and two endmost panels die cut from said blank and foldably joined side by side, said panels being folded to form a prismatic body having three reflective surfaces at 60° to each other within said body, one of said endmost panels having a side tab containing a slit and the other of said endmost panels having a grip tab which passes through said slit in assembly joining said endmost panels and projects outward from the panels to form a handle for said kaleidoscope, a rounded eye piece die cut from said blank containing a triangular opening of the same size as the end of said body to which said eye piece is attached, end flaps of said panels containing slits, said end flaps being folded outward from the end of said body to which said eye piece is attached, and three eye piece tabs extending inward from the sides of said triangular opening, said eye piece tabs being folded and inserted through the slits in said end flaps securing said eye piece to said body.

* * * * *